(No Model.)

F. H. RICHARDS.
MECHANICAL MOVEMENT.

No. 338,302. Patented Mar. 23, 1886.

Witnesses:
Frank H. Pierpont
John Johnston.

Inventor:
Francis H. Richards.

N. PETERS, Photo-Lithographer, Washington, D. C.

UNITED STATES PATENT OFFICE.

FRANCIS H. RICHARDS, OF SPRINGFIELD, MASSACHUSETTS.

MECHANICAL MOVEMENT.

SPECIFICATION forming part of Letters Patent No. 338,302, dated March 23, 1886.

Application filed August 31, 1885. Serial No. 175,823. (No model.)

*To all whom it may concern:*

Be it known that I, FRANCIS H. RICHARDS, a citizen of the United States, residing at Springfield, in the county of Hampden, State of Massachusetts, have invented a new and useful Mechanical Movement, of which the following is a specification.

This invention relates to that class of mechanical movements which are constructed to be operated sometimes by hand and sometimes by other power, the object being to provide a movement of that class in which the mode of operation may be determined by means of a secondary motion of the part whereby it is operated by hand.

To this end the invention consists in the combinations hereinafter described and claimed.

Figure 1:
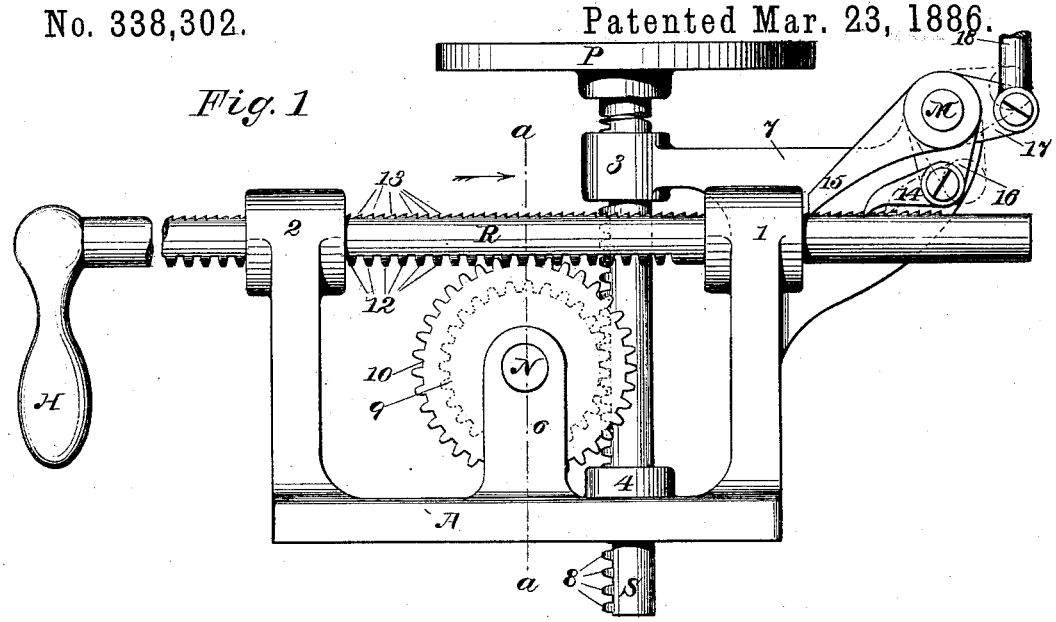
Figure 2:
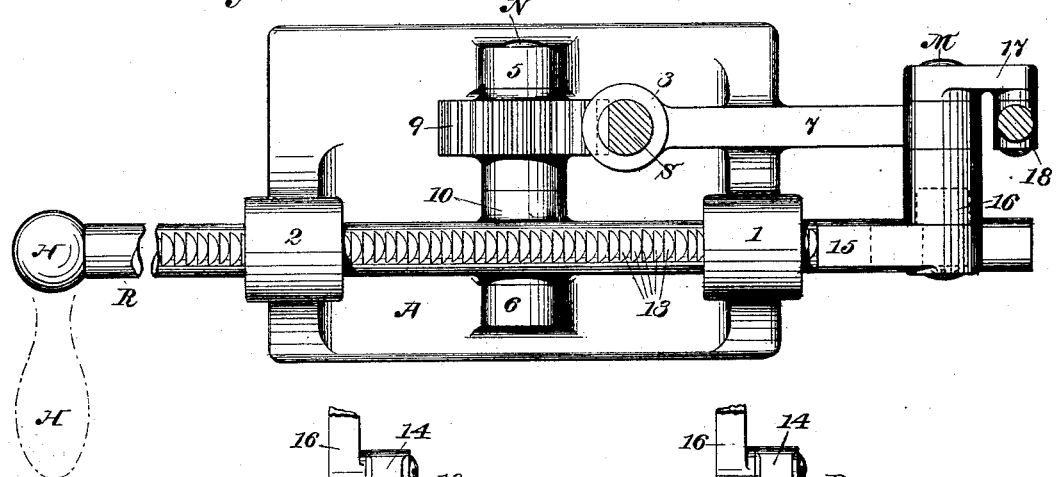
Figure 3:
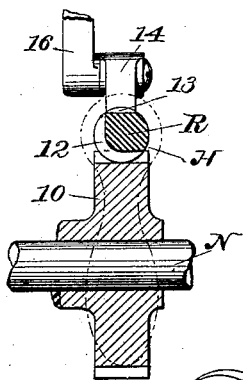
Figure 4:
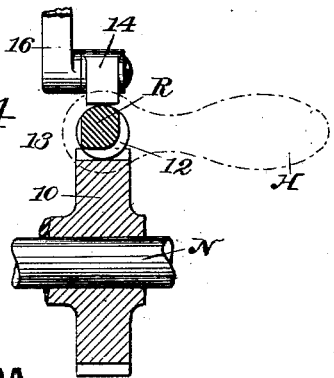
Figure 5:
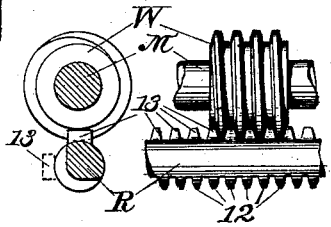

In the drawings accompanying and forming part of this specification, Figure 1 is a side elevation of a mechanical movement embodying my invention. Fig. 2 is a top view of the same. Fig. 3 is a partial sectional view in line $a\ a$, Fig. 1. Fig. 4 is a similar view showing a change in the position of certain parts. Fig. 5 illustrates a modification in the construction of the means shown for operating the movement by power.

Similar characters designate like parts in all the figures.

Referring to the drawings, A designates the base of a frame-work for holding the operative parts. This is provided with bearings 2 3 for sliding rod R, bearings 3 4 for slide S, bearings 5 6 for shaft N, and bracket 7 for supporting driving-shaft M. As shown, slide S is placed at right angles to rod R; but this position is immaterial. Supported on said slide, P is supposed to be a platform or other part for the proper moving of which the mechanical movement is especially designed. Slide S, which may obviously have any desired form, has teeth 8, meshing with pinion 9, which is fixed to the shaft N, which shaft is driven by gear 10. This gear 10 meshes with rack-teeth 12, formed on rod R, which teeth extend partially around said rod, as shown in Figs. 3 and 4. Rod R is provided with a handle, H, whereby the operator can slide and rotate it, as indicated by the dotted lines in said figures, without affecting the proper engagement of the said rack-teeth and gear. Said handle also acts as a weight to keep the rod in its normal position. (Shown in Figs. 1, 2, and 3.) On its upper side said rod has a series of notches or ratchet-teeth, 13, adapted to be acted on by a reciprocating pawl, 14, or other similar means for moving the rod lengthwise in its bearings. When, however, the rod is turned out of its normal position, said teeth are carried over to one side, as in Fig. 4, so that the pawl rests on the smooth surface of said rod, which may then be freely moved under said pawl in either direction, regardless of whether that is in operation or not. Having been moved by hand far enough, the rod is turned back to its normal position, when the pawl re-engages with the teeth 13 to hold or feed along the rod, accordingly as it is itself at rest or in operation.

As the parts are arranged in the drawings, slide S is supposed to have sufficient weight (acting through the gearing) to move said rod to the right hand in Figs. 1 and 2, the pawl only acting to move said rod toward left hand. In this case a holdfast-pawl, 15, may be employed to co-operate, in the usual manner, with pawl 14. This pawl 14 may be operated, in the usual way, by an arm, 16, fixed on shaft M, which shaft is operated by arm 17 and a reciprocating rod, 18.

Instead of a ratchet mechanism for operating rod R, shaft M may carry worm (or gear) W, Fig. 5, meshing with teeth 13, (in this case corresponding rack-teeth,) which will then ordinarily require to be raised above rod R, as shown in this figure. By this means the rod may be moved by power in either or both directions. This arrangement I have illustrated and described as one equivalent to the rod-driving devices shown in Figs. 1 and 2.

It will be understood that the slide S and its driving-gear 9 are not a part of my newly-invented mechanical movement, but are introduced merely to illustrate one application of my invention.

Having thus described my invention, I claim—

1. In a mechanical movement, the combination of an oscillating sliding rod, driven gearing, substantially as described, adapted not to be disconnected, and driving-gearing, substantially as described, adapted to be disconnected by a rotary movement of said rod, substantially as set forth.

2. In a mechanical movement, the combination of rod R, provided with teeth 12 and 13, a gear meshing with teeth 12, and a ratchet mechanism, substantially as described, adapted to move said rod by means of teeth 13, said rod being constructed to be rotated for disconnecting said ratchet mechanism, substantially as set forth.

FRANCIS H. RICHARDS.

Witnesses:
FRANK H. PIERPONT,
ROBERT L. PECK.